US008826140B2

(12) United States Patent
Yanagawa

(10) Patent No.: US 8,826,140 B2
(45) Date of Patent: Sep. 2, 2014

(54) COMMUNICATION DEVICE FOR ACCESSING CONTENT-RELATED INFORMATION FROM A NETWORK

(75) Inventor: Ryo Yanagawa, Aichi (JP)

(73) Assignee: Brother Kogyo Kabushiki Kaisha, Nagoya, Aichi (JP)

(*) Notice: Subject to any disclaimer, the term of this patent is extended or adjusted under 35 U.S.C. 154(b) by 653 days.

(21) Appl. No.: 12/604,928

(22) Filed: Oct. 23, 2009

(65) Prior Publication Data

US 2010/0106862 A1    Apr. 29, 2010

(30) Foreign Application Priority Data

Oct. 27, 2008 (JP) ................... 2008-275168

(51) Int. Cl.
*G06F 3/00* (2006.01)
*G06F 3/14* (2006.01)
(52) U.S. Cl.
USPC .......................................... 715/738; 715/864
(58) Field of Classification Search
CPC .................................... G06F 3/14; G06F 3/00
USPC .................................................. 715/738, 864
See application file for complete search history.

(56) References Cited

U.S. PATENT DOCUMENTS

| 5,682,540 | A  | * | 10/1997 | Klotz et al. ................... 715/209 |
| 6,351,270 | B1 | * | 2/2002  | Nishikawa et al. ........... 715/717 |
| 7,155,489 | B1 | * | 12/2006 | Heilbron et al. .............. 709/217 |
| 7,349,577 | B2 | * | 3/2008  | Kaneda et al. ................ 382/190 |
| 7,761,799 | B2 | * | 7/2010  | Pell et al. ...................... 715/745 |
| 2005/0144560 | A1 | * | 6/2005 | Gruen et al. .................. 715/711 |
| 2005/0185825 | A1 |   | 8/2005 | Hoshino et al. |
| 2006/0117092 | A1 | * | 6/2006 | Yanagi et al. ................. 709/217 |
| 2006/0236142 | A1 | * | 10/2006 | Karn .............................. 713/300 |
| 2006/0238810 | A1 | * | 10/2006 | Fukudome .................... 358/1.16 |
| 2007/0174298 | A1 |   | 7/2007 | Tanimoto |

(Continued)

FOREIGN PATENT DOCUMENTS

| JP | 2005-228102 | 8/2005 |
| JP | 2006-215741 | 8/2006 |

(Continued)

OTHER PUBLICATIONS

Japanese Official Action dated Sep. 28, 2010 together with partial English translation.

*Primary Examiner* — Doon Chow
*Assistant Examiner* — Le Nguyen
(74) *Attorney, Agent, or Firm* — Scully, Scott, Murphy & Presser, PC

(57) ABSTRACT

A communication device to access a network device storing content-related information is provided. The content-related information includes a title and location information of information content. The communication device includes a location information storage to store the location information, a content-related information obtaining system to obtain the content-related information from the network device, a content-related information storage to store the obtained content-related information, a multiple-display system having a plurality of display areas, a display control system to control the title to be displayed in a fixed line in each display area, a selection receiver system to receive a selection of the title of the information content displayed in the fixed line in one of the display areas, an identifying system to identify the location information corresponding to the selected title, and a location information output system to output the identified location information to a displayable device.

4 Claims, 8 Drawing Sheets

(56) References Cited

U.S. PATENT DOCUMENTS

| | | | |
|---|---|---|---|
| 2008/0165133 A1* | 7/2008 | Blumenberg et al. | 345/173 |
| 2008/0165209 A1 | 7/2008 | Kondo et al. | |
| 2009/0013071 A1 | 1/2009 | Matoba et al. | |
| 2009/0021780 A1 | 1/2009 | Sato et al. | |
| 2009/0083373 A1 | 3/2009 | Matoba et al. | |
| 2010/0036855 A1 | 2/2010 | Sasaki et al. | |
| 2010/0083126 A1 | 4/2010 | Inada | |

FOREIGN PATENT DOCUMENTS

| | | |
|---|---|---|
| JP | 2006-324918 | 11/2006 |
| JP | 2007-179320 | 7/2007 |
| JP | 2007-199998 | 8/2007 |
| JP | 2007-299272 | 11/2007 |
| JP | 2008-099030 | 4/2008 |
| JP | 2008-102567 | 5/2008 |
| JP | 2008-165692 | 7/2008 |
| JP | 2008-210042 | 9/2008 |
| JP | 2009-015713 | 1/2009 |
| JP | 2009-075967 | 4/2009 |
| JP | 2010-81017 | 4/2010 |
| JP | 2010-87719 | 4/2010 |

* cited by examiner

COMMUNICATION DEVICE FOR ACCESSING CONTENT-RELATED INFORMATION FROM A NETWORK

CROSS REFERENCE TO RELATED APPLICATION

This application claims priority from Japanese Patent Application No. 2008-275168, filed on Oct. 27, 2008, the entire subject matter of which is incorporated herein by reference.

BACKGROUND

1. Technical Field

The present invention relates to a communication device.

2. Related Art

A technique to manipulate an information processing device to obtain articles in RSS (Resource description framework Site Summary) format from a delivery site and display a list of titles included in the articles is known.

According to the technique, a list of titles which are included in the obtained RSS-formatted articles is displayed in a display unit of the information processing device. Further, operation buttons to receive a user's input are displayed to be associated with the titles of the articles respectively. When one of the buttons is operated by the user to select the associated title, the information processing device accesses a location defined by a URL (Uniform Resource Locator), which is contained in the RSS-formatted articles, and obtains a web page (i.e., content) of information corresponding to the selected title. The obtained information content is displayed in the display unit of the information processing device.

Thus, the user can manipulate the information processing device to display the information content corresponding to the selected title by operating the buttons displayed in the display unit.

According to the above technique, the information content to be obtained is determined by the user's operation to one of the buttons. That is, a single piece of information content can be obtained by an operation to the button. In other words, a plurality of pieces of information contents cannot be obtained by a single operation. When the user desires to view a plurality of pieces of information contents, the user is required to operate one of the buttons to select a title corresponding to the piece of information content among the list of titles being displayed. After the desired information content is obtained, and the user views the information content, the user manipulates the information processing device to return to the list of the titles being displayed. Thereafter, again, the user is required to operate another one of the buttons to select a next title so that the next information content can be obtained to be viewed.

SUMMARY

Thus, in order to obtain a plurality of pieces of information, the user is required to repeat the redundant operations.

In view of the above, the present invention is advantageous in that a communication device, which is capable of presenting a plurality of information contents without requiring the user to manipulate the communication device redundantly, is provided.

According to an aspect of the present invention, a communication device capable of accessing a network device storing a plurality of pieces of content-related information is provided. Each of the pieces of content-related information includes a title and location information of information content. The communication device includes a location information storage configured to store the location information of the content-related information, a content-related information obtaining system configured to access the network device according to the location information and obtain the content-related information from the network device, a content-related information storage to store the obtained content-related information, a multiple-display system having a plurality of display areas, each of which is capable of displaying a line of character strings, the character strings representing the title of the information content included in the obtained content-related information, a display control system configured to control the title to be displayed in a fixed line in each of the plurality of display areas, a selection receiver system configured to receive a selection of the title of the information content displayed in the fixed line in one of the display areas, an identifying system configured to identify the location information of the information content corresponding to the selected title of the information content based on the content related-information in which the selected title of the information content is included, and a location information output system configured to output the identified location information to a displayable device, which is capable of accessing and obtaining the information content according to the outputted location information in order to present the obtained information content to be viewed.

According to another aspect of the present invention, a communication device capable of accessing a network device storing a plurality of pieces of content-related information is provided. Each of the pieces of content-related information includes a title and summary information of information content. The communication device includes a location information storage configured to store the location information of the content-related information, a content-related information obtaining system configured to access the network device according to the location information and obtain the content-related information from the network device, a content-related information storage to store the obtained content-related information, a multiple-display system having a plurality of display areas, each of which is capable of displaying a line of character strings, the character strings representing the title of the information content included in the obtained content-related information, a display control system configured to control the title to be displayed in a fixed line in each of the plurality of display areas, a selection receiver system configured to receive a selection of the title of the information content displayed in the fixed line in one of the display areas, an identifying system configured to identify the summary information of the information content corresponding to the selected title of the information content based on the content related-information in which the selected title of the information content is included, and a scroll-displaying system configured to display character strings representing the identified summary information in the one of the plurality of display areas, in which the title of selected information content is displayed in the fixed line, in a scrolling line in place of the title of information content being displayed in the fixed line.

According to still another aspect of the present invention, a communication device capable of accessing a network device storing a plurality of pieces of content-related information is provided. Each of the pieces of content-related information includes a title and location information of information content. The communication device includes a location information storage configured to store the location information of the content-related information, a content-related information obtaining system configured to access the network device according to the location information and obtain the content-related information from the network device, a content-related information storage to store the obtained content-related information, a multiple-display system having a plurality of display areas, each of which is capable of displaying a line of character strings, the character strings representing the title of the information content included in the obtained content-related information, a display control system configured to control the title to be displayed in a fixed line in each of the plurality of display areas, an all-selection accepting system configured to accept a plurality of pieces of location information, corresponding to all the titles of the information contents displayed in the fixed lines in all of the display areas, to be outputted, an all-identifying system configured to identify all the location information of the information contents corresponding to all the titles of the information contents displayed in the fixed lines based on the content related-information in which the displayed titles of the information contents are included, and a location information output system configured to output all the identified location information to a displayable device, which is capable of accessing and obtaining the information contents according to the outputted location information in order to present the obtained information contents to be viewed.

BRIEF DESCRIPTION OF THE ACCOMPANYING DRAWINGS

DETAILED DESCRIPTION

Figure 1:
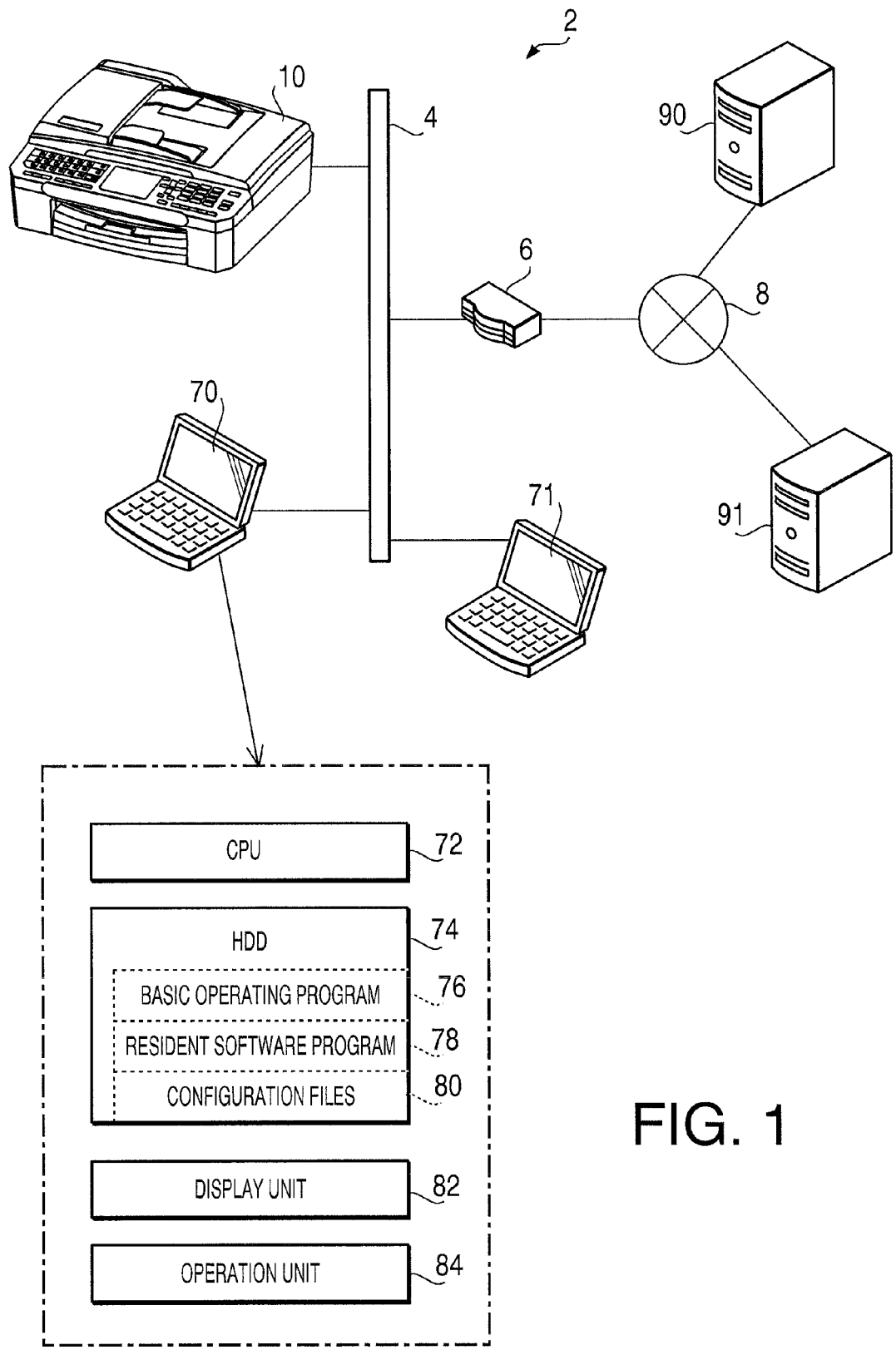
FIG. 1 is a schematic diagram to illustrate an MFP (Multifunction peripheral) system according to an embodiment of the present invention.

Hereinafter, an embodiment according to an aspect of the present invention will be described with reference to the accompanying drawings. An MFP system 2 according to the present embodiment includes, as shown in FIG. 1, an MFP 10, a plurality of personal computers (PCs) 70, 71, and a plurality of content providing servers 90, 91. Numbers of the PCs and the content providing servers are not limited to two, but are variable.

The MFP 10 according to the present embodiment is a communication device connected to a local area network (LAN) 4 and provides a plurality of functions such as printing and scanning images, and making telephone calls. The LAN 4 is connected to the Internet 8 through an intervening router 6. The content providing servers 90, 91 are connected to the Internet 8. According to the present embodiment, the content providing server 90 provides an information site to public, whilst the content providing server 91 provides another information site to public. Each of the information sites includes a plurality of information contents. Further, each of the content providing servers 90, 91 stores feed information. The feed information is RSS-formatted information which is related to the information contents included in the information site. The feed information may include summary of the information contents. The information stored in the information sites will be described later in detail.

Next, internal configuration of the PC 70 will be described. It is to be noted that the PC 71 is configured similarly to the PC 70; therefore detailed description of the PC 71 is represented by that of the PC 70. The PC 70 includes a CPU 72, a hard disk drive (HDD) 74, a display unit 82, and an operation unit 84. Further, the PC 70 is equipped with a network interface (not shown), which connects the PC 70 with the LAN 4.

The CPU 72 is processing unit to process various data according to basic program 76 and resident software program 78. The HDD 74 is a storage unit to store the program 76 and the resident software program 78 therein. The basic program 76 controls basic operations of the PC 70 and includes browser software for downloading contents from an information site in the Internet to display.

The resident software program 78 is a program to manipulate the PC 70 according to various instructions passed from the MFP 10. The resident software program 78 is installed in the MFP 10 via, for example, a computer readable medium. Alternatively, the resident software program 78 may be downloaded from an information providing site in the Internet 8 to be installed in the PC 70.

The HDD 74 stores a configuration file 80 therein. The configuration file 80 includes information concerning an IP address of the MFP 10. The configuration of the PC 70 in connection with the MFP 10 is set, for example, by a user. The PC 70 is capable of recognizing the MFP 10 based on the IP address stored in the configuration file 80. The MFP 10 may be identified by alternative identifying information, which is for example a node name of the MFP 10.

The display unit 82 is capable of displaying various information concerning, for example, the PC 70 itself and the other devices. According to the present embodiment, the display unit 82 is equipped with a display screen, which is larger than a display panel 50 (FIG. 2) of the MFP 10. The operation unit 84 including a keyboard and a mouse is operated by the user in order to input various instructions and information.

Figure 2:
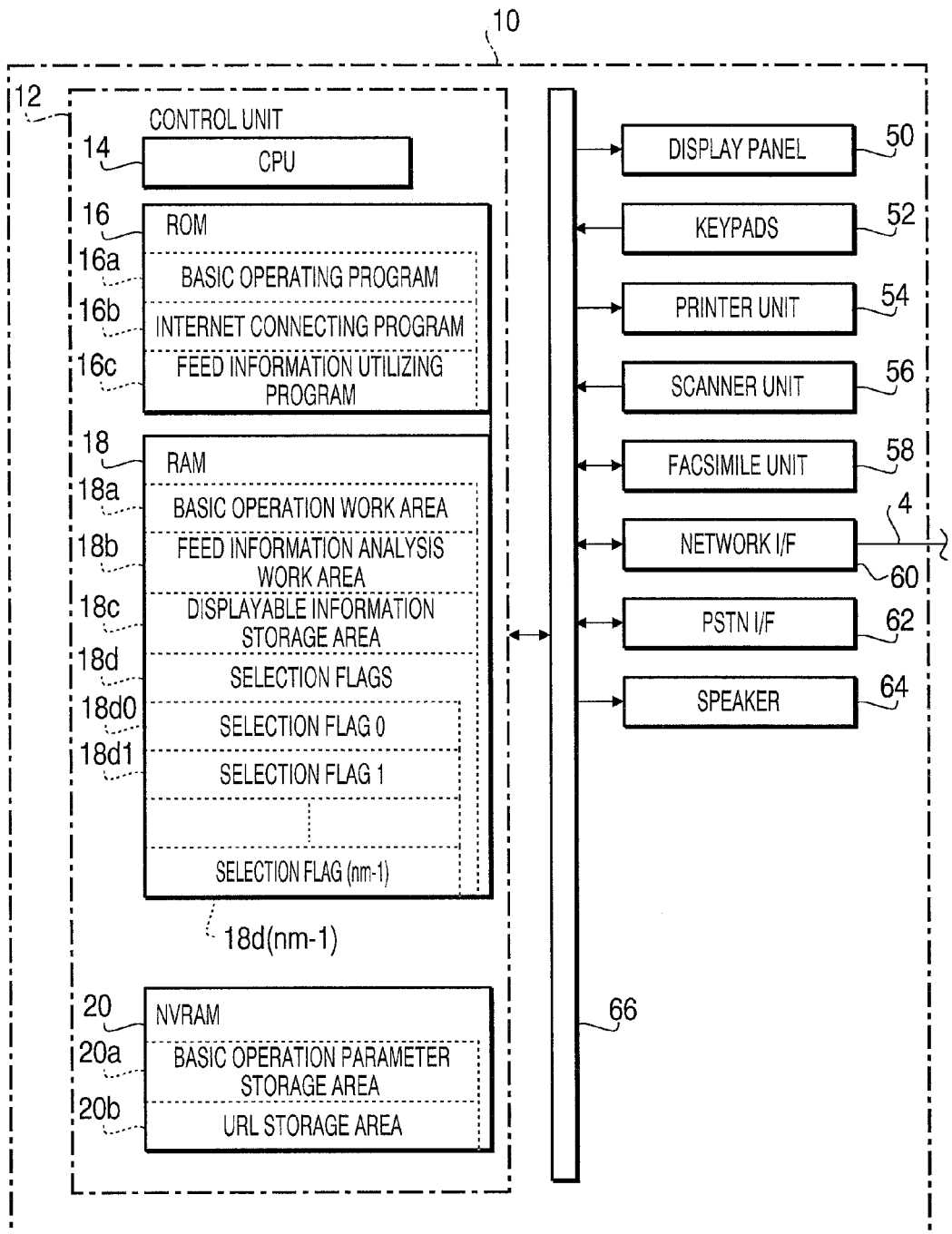
FIG. 2 is a block diagram to illustrate an electric configuration of the MFP according to the embodiment of the present invention.

Next, configuration of the MFP 10 will be described with reference to FIG. 2. The MFP 10 includes a control unit 12, the display panel 50, a key pad 52, a printer unit 54, a scanner unit 56, a facsimile unit 58, a network interface (I/F) 60, a PSTN interface (I/F) 62, and a speaker 64. The control unit 12 and the remaining of the above components 50-64 are connected with one another through a bus line 66. The control unit 12 includes a CPU 14, a ROM 16, a RAM 18, and an NVRAM 20.

The CPU 14 is a processing unit to process various data according to programs 16a-16c stored in the ROM 16. Data processing of the CPU 14 will be described later in detail with reference to FIGS. 5-8. The ROM 16 is a non-rewritable and non-volatile memory to store the programs 16a-16c.

The programs 16a-16c to be stored in the ROM 16 includes a basic operating program 16a, an internet connecting program 16b, and a feed information utilizing program 16c. The basic operating program 16a is a program to control basic behaviors of the MFP 10. The basic operating program 16a includes, for example, a program to generate display-usable data, by which images are reproduced in the display panel 50. The basic operating program 16a further includes programs to control behaviors of each of the unit components 50-64. The internet connecting program 16b is a program to connect the MFP 10 to the Internet 8. The feed information utilizing program 16c is a program to analyze feed information obtained from the contents providing server 90, 91 and create information (hereinafter, displayable information) to be displayed through the display panel 50, and displays the created displayable information. The feed information utilizing program 16c is activated by a user's operation to the keypad 52.

The RAM 18 is a rewritable volatile memory, which has memory areas 18a-18d. The memory areas in the RAM 18 include a basic operation work area 18a, a feed information analysis work area 18b, a displayable information storage area 18c, and a flag storage area 18d. The basic operation work area 18a is a storage area to store various data being generated during the operations of the CPU 14 according to the basic operating program 16a. The feed information analysis work area 18b is a storage area to store various data being generated during the operations of the CPU 14 according to the feed information utilizing program 16c. The displayable information storage area 18c is a storage area to store the displayable information, which is generated based on the obtained feed information according to the feed information utilizing program 16c.

A selection flag storage area 18d is an area to store settings of selection flags 18d0 through 18d (nm−1). The selection flags 18d0 through 18d(nm−1) are set on when the character strings included in the updated-content information 132 are used to be scroll-displayed and when the URL 146 included in the updated-content information 132 is provided to the PCs 70, 71. The selection flags 18d0 through 18d(nm−1) are provided for each piece of updated-content information 132, and a number of the selection flags 18d0 through 18d(nm−1) corresponds to a number of pieces of updated-content information 132. The number of pieces of updated-content information 132 is equivalent to a number of information contents to be provided through an information site of each information providing server 90, 91.

According to the MFP 10 of the present embodiment, each URL from which the feed information is obtained is assigned a number, which is one of 0 through n−1 (n is an integer greater than or equal to 1). Therefore, a number n of the URLs are stored in the URL storage area 20b (see FIG. 3). Further, each URL in the storage area 20b is associated with a piece of updated-content information 132, which is stored in the displayable information storage area 18c. Each piece of updated-content information 132 is assigned a number, which is one of 0 through m−1 (m is an integer greater than or equal to 1). Therefore, m pieces of updated-content information 132 are stored in the displayable information storage area 18c (see FIG. 4). Accordingly, the number n*m of the selection flags 18d0 through 18d(nm−1) are prepared in the selection flag storage area 18d. In the present embodiment, usage of the selection flags 18d0 through 18d(mn−1) is determined according to a number of pieces of updated-content information 132 stored in the displayable information storage area 18c.

The NVRAM 20 is a rewritable non-volatile memory and includes a basic operation parameter storage area 20a and a URL storage area 20b. The basic operation parameter storage area 20a is a storage area to store parameters to be used during the operations of the CPU 14 according to the basic operating program 16a. The parameters may be, for example, settings concerning printing and settings concerning scanning. The URL storage area 20b is a storage area to store URLs, which indicate locations of the feed information to be obtained.

According to the present embodiment, the user is required to set URLs indicating the locations, from which desired contents can be obtained, in order to receive the information services from the content providing servers 90, 91. The settings of the URLs can be entered through a user interface screen (not shown) for entering information site settings, which is provided to the user through the display panel 50. When the URLs indicating the locations for the feed information are entered by the user through the keypad 52, the entered URLs are stored in the URL storage area 20b.

The URLs of the locations for the feed information may be entered through the PCs 70, 71 alternatively to the user interface provided through the display panel 50 of the MFP 10. For example, when the user manipulates the PC 70 and enters the URL to receive the information service from the content providing server 90, the URL entered in the PC 70 is passed to the MFP 10, which stores the received URL in the URL storage area 20b. Thus, the URL entered by the user through the PC 70 is stored in the URL storage area 20b.

The display panel 50 is a display device to output various information for the user to view. The According to the present embodiment, a display screen of the display panel 50 is smaller than the screen of the display unit 82 in the PCs 70, 71. Further, the display panel 50 in the present embodiment is a touch-sensitive panel, through which the user's instructions can be entered. The keypad 52 includes a plurality of keys, which can be manipulated by the user to enter various instructions and information in the MFP 10. The printer unit 54 is equipped with a printing mechanism to form images on recording media in printing methods such as inkjet-printing or laser-printing. The scanner unit 56 is equipped with a reading mechanism such as a CCD or CIS. The facsimile unit 58 is configured to communicate with other external facsimile machine to transmit and receive images. The network interface 58 connects the MFP 10 with the LAN 4. Therefore, the MFP 10 is capable of communicating with the PCs 70, 71 and accessing the Internet 8. The PSTN interface 62 connects the MFP 10 with a PSTN (Public Switched Telephone Network) (not shown). Facsimile and telephone communications are established through the PSTN. The speaker 64 generates a calling sound when an incoming call reaches the MFP 10.

Figure 3:
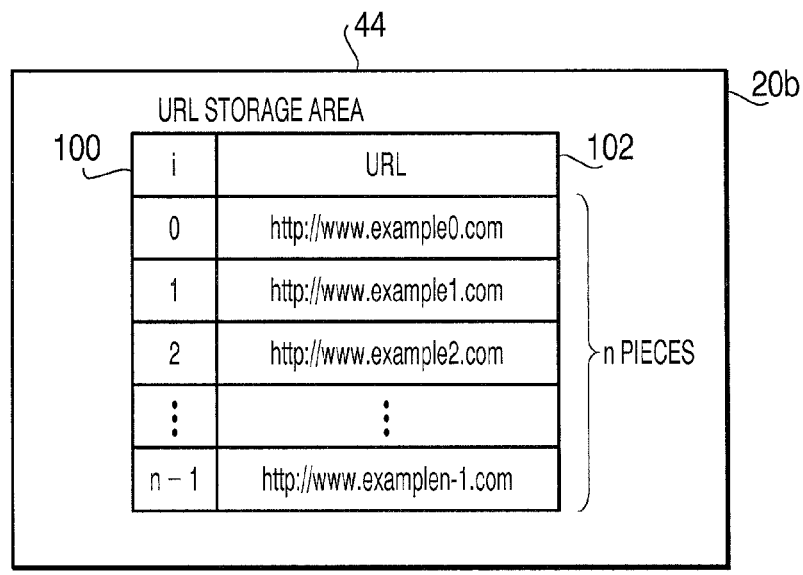
FIG. 3 illustrates a memory area for storing URLs in the MFP according to the embodiment of the present invention.

Next, data to be stored in the URL storage area 20b will be described with reference to FIG. 3. The URL storage area 20b is a storage area to store URLs 102 indicating locations, from which the feed information of the content providing servers 90, 91 is obtained. In FIG. 3, the URL storage area 20b stores n pieces of URLs 102 therein. Each of the URLs 102 in the URL storage area 20b is provided with an identification number 100. In the present embodiment, the identification number 100 is represented by a sign "i."

Figure 4:
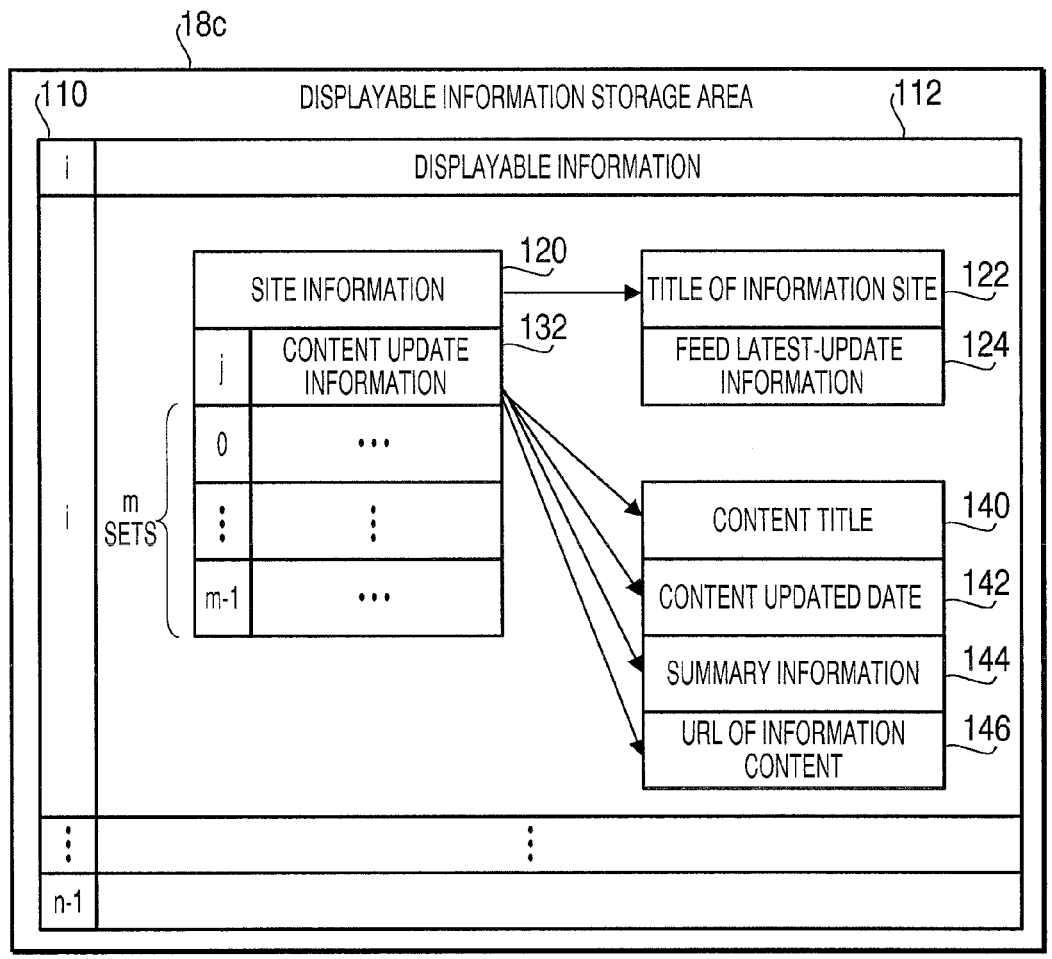
FIG. 4 illustrates a memory area for storing information to be displayed in a display unit of the MFP according to the embodiment of the present invention.

Next, data to be stored in the displayable information storage area 18c will be described with reference to FIG. 4. The displayable information storage area 18c is an area to store displayable information 112 for each URL stored in the URL storage area 20b. The URL storage area 20b includes n pieces of URLs. In this regard, n is an integer greater than or equal to 1. Accordingly, the displayable information storage area 18c stores n pieces of displayable information 112 as well. Each piece of displayable information 112 is provided with an identification number 110. The identification number 110 in the displayable information storage area 18c and the identification number 100 in the URL storage area 18b are identical. Therefore, the identification number 110 is also represented by the sign "i."

Next, a data structure of the displayable information 112 will be described. The displayable information 112 includes a piece of site information 120. The site information 120 includes a character string 122 and feed latest-update information 124. The character string 122 represents a title of the information site. The feed latest-update information 124 is information concerning a time of latest update in which the feed information in the content providing servers 90, 91 is updated at latest.

The displayable information 112 includes at least one piece of updated-content information 132. A number of pieces of updated-content information 132 is equal to a number of pieces of information contents provided from the information site. In the example shown in FIG. 4, the displayable information 112 with the identification number (i) being 0 (zero) includes m pieces of updated-content information 132. In this regard, m is an integer greater than or equal to 1. Therefore, it is noted that the information site with the identification number being 0 includes m pieces of information contents. For example, when an information site provides a piece of information content concerning weather news and a piece of information content concerning sports news, the displayable information 112 of the information site includes two pieces of updated-content information 132. Each piece of updated-content information 132 is identified by an identification number 130. In the present embodiment, the identification number 130 is represented by a sign "j."

The updated-content information 132 includes a character string 140 representing a title of the information contents (hereinafter, "content title 140"), content updated date 142, content summary 144, and an URL 146 of the information contents. According to the above-described example, each of the updated-content information 132 for the information content concerning the weather news and the updated-content information 132 for the information content concerning the sports news includes the above-described information 140, 142, 144, 146 respectively. The content updated date 142 is information concerning a time of latest update in which the information contents is updated in the content providing servers 90, 91 at latest. The content summary 144 includes character strings representing information which summarizes the information in the content to be provided from the information site. The content summary 144 therefore generally includes a greater number of character strings than the character string in the content title 140. Meanwhile, the number of character strings in the content summary 144 is smaller than a number of character strings included in the information content. The URL 146 of the information contents indicates a location of the information contents. In the MFP 10 according to the present embodiment, the content title 140 is displayed in a scrolling horizontal line (so-called ticker display) in the display panel 50. Additionally, the updated-content information 132 and the URL 146 of the information contents may be displayed in scrolling horizontal lines in the display panel 50.

Next, the processes to be executed by the CPU 14 of the MFP 10 will be described with reference to FIGS. 5-8. A main flow of a process to be executed by the CPU 14 of the MFP 10 will be described with reference to FIG. 5. The main flow starts when the feed information utilizing program 16c stored in the ROM 16 is activated. The main flow is repeated as long as the feed information utilizing program 16c is maintained active.

When the main flow starts, in S1, the CPU 14 determines the displayable information 112 including the content titles 140, which are to be displayed in a scrolling horizontal line in the display panel 50. In particular, the CPU 14 determines the identification number (i) representing the identification number 110 stored in the displayable information storage area 18c in order to determine the displayable information 112 to be displayed. In the present embodiment, the CPU 14 initially determines the displayable information 112 with the identification number 110 being the smallest number (i.e., i=0) to be displayed.

In S2, the CPU 14 obtains the content titles 140 included in the displayable information 112 determined in S1 and displays the character strings included in the content titles 140 in a single scrolling horizontal line in a predetermined display area of the display panel 50. In particular, the CPU 14 determines the identification number 130 (j) stored in the displayable information storage area 18c in order to determine the content titles 140 to be displayed in the scrolling horizontal line. In the present embodiment, the CPU 14 determines the content title 140 with the identification number 130 being the smallest number (i.e., j=0) to be displayed. Accordingly, the content title 140 included in the updated-content information 132 with the identification number (j) being 0 is displayed in the scrolling horizontal line in the predetermined display area of the display panel 50. When display of the entire character string in the content title 140 completes, the CPU 14 increments the value (j) of the identification number 130 by one (i.e., j=1). Therefore, a next content title 140 with the identification number 130 being 1 (i.e., j=1) is determined to be displayed in the scrolling horizontal line in the predetermined area of the display panel 50. The identification number 130 (j) is incremented to the largest identification number 130 (i.e., m−1) included in the displayable information 112 determined in S1.

Figure 9A:
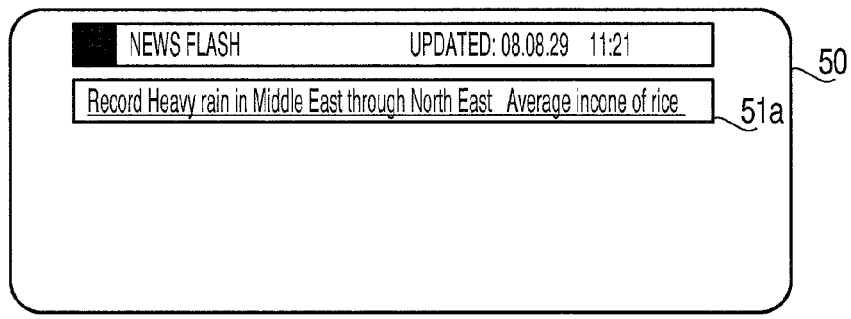
FIGS. 9A-9E illustrate information contents to be displayed on a display panel according to the embodiment of the present invention.

FIG. 9A illustrates the character strings included in the content titles 140 being displayed in the scrolling horizontal line in a display area 51a. The character strings being displayed in FIG. 9A are the content titles 140 included in the displayable information 112, which was determined to be displayed in S1. Thus, the user is allowed to view the character strings included in the content titles 140 in the single scrolling horizontal line in the display area 50a.

Following S2, in S3, the CPU 14 judges as to whether the character strings in the content titles 140 being displayed in the scrolling horizontal line in the display area 51a are touched by the user. According to the present embodiment, the display panel 50 is configured to be touch-sensitive; therefore, the CPU 14 can detect the user's touch to the display panel 50 displaying the content titles 140.

In S3, if the CPU 14 determines that none of the content titles 140 being displayed is touched by the user (S3: NO), in S4, the CPU 14 judges as to whether display of all the content titles 140 included in the displayable information 112, which was determined to be displayed in S1, completed. In particular, the CPU 14 examines as to whether the identification number 130 (j) in the displayable information 112 indicates the largest number (i.e., m−1) among the identification numbers 130 of the other updated-content information 132 included in the displayable information 112. Further, the CPU 14 judges as to whether display of the entire character string in the content title 140 corresponding to the largest identification number completed. For example, as shown in FIG. 4, if the displayable information 112 includes m pieces of content titles 140, the CPU 14 determines that the display of the content titles 140 completed when display of the content title 140 with the largest identification number 130 (j=m−1) completed. When, on the other hand, the identification number 130 of the content title 140 having been displayed is smaller than (m−1), the CPU 14 determines that display of all the content titles 140 in the displayable information 112 has not been completed.

In S4, when scroll-display of all the content titles 140 included in the displayable information 112 completed (S4: YES), the flow returns to S1, and the CPU 14 determines next displayable information 112 to be displayed. When scroll-display of all the content title 140 has not been completed (S4: NO), the flow returns to S2.

In S3, if the CPU 14 detects the user's touch to character strings in the content title 140 being displayed (S3: YES), in S5, the CPU 14 identifies the currently designated displayable information 112 based on the identification number 110 and displays all the content titles 140 included in the identified displayable information 112 in the display panel 50. In this regard, the content titles 140 are displayed in fixed horizontal lines, rather than in a scrolling horizontal line.

The behavior of the CPU 14 in S5 will be described with reference to FIG. 9B. In the example shown in FIG. 9B, three content titles 140 are included in the current displayable information 112. Therefore, the identification information 130 (j) numbered from 0 through 2 are included.

In S5 in the main flow (FIG. 5), all the content titles 140 included in the current displayable information 112 are displayed in fixed lines in the display areas 51a, 51b, 51c. Thus, the content titles 140 lined up in parallel allow the user to view in shorter time than the content titles 140 displayed sequentially in a scrolling line. When the content titles 140 are displayed in the fixed lines in the display areas 51a-51c, an enter button 51d is displayed and presented to the user. When the enter button 51d is touched, the flow of the CPU 14 in the main process proceeds to S12 and enters a select-all operation.

The number of the fixed lines to display the content titles 140 in the display panel 50 can be incremented and decremented according to the number of the content titles 140 included in the current displayable information 112. When the current displayable information 112 includes five content titles 140, two more fixed lines are added to the fixed lines in the display areas 51a-51c shown in FIG. 5B. When the current displayable information 112 includes solely one content title 140, the lower two lines 51b, 51c are not displayed in the display panel 50.

Description of the main flow will be continued. Following S5, in S6, the CPU 14 judges as to whether the user's touch to any one of the content titles 140 being displayed in the fixed lines in the display areas 51a-51c is detected. When no user's touch to the content title 140 is detected (S6: NO), the flow returns to S5. When the user's touch is detected (S6: YES), in S7, the user's touch is a short touch. In the present embodiment, when continuance of the user's touch is within a predetermined period (e.g., one second), the touch is determined to be a short touch. When the continuance is equal or over the predetermined period, the touch is determined to be a long touch.

In S7, when the short touch to the content title 140 is detected (S7: YES), the flow proceeds to a normal mode operation in S8. When the user's touch detected in S6 is not the short touch (S7: NO), in S9, the CPU 14 judges as to whether the user's touch is the long touch.

In S9, when the long touch to the content title 140 is detected (S9: YES), the flow proceeds to multiple selection operation in S10. When the user's touch detected in S6 is not the long touch (S9: NO), in S11, the CPU 14 judges as to whether the user's touch is a touch to the enter button 51d.

In S11, when the touch to the enter button 51d is detected (S11: YES), the flow proceeds to the select-all operation in S12. When the user's touch detected in S6 is not the touch to the enter button 51d (S11: NO), the CPU 14 determines that the detected touch is an instruction to terminate the main flow. Therefore, in S13, the CPU 14 inactivates the feed information utilizing program 16c and terminates the main flow.

Figure 5:
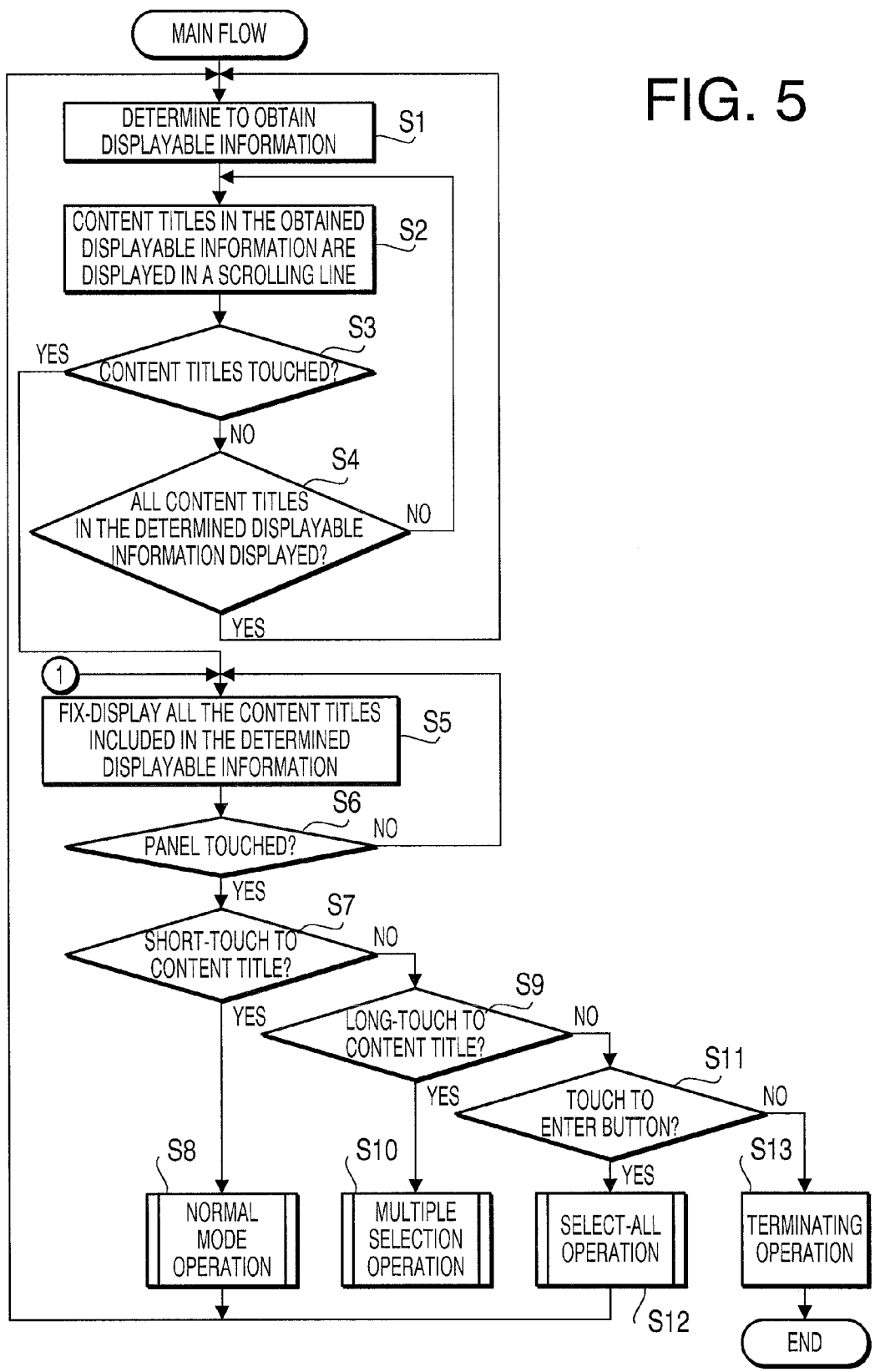
FIG. 5 is a flowchart to illustrate a main flow of a process to be executed by the MFP according to the embodiment of the present invention.
Figure 6:
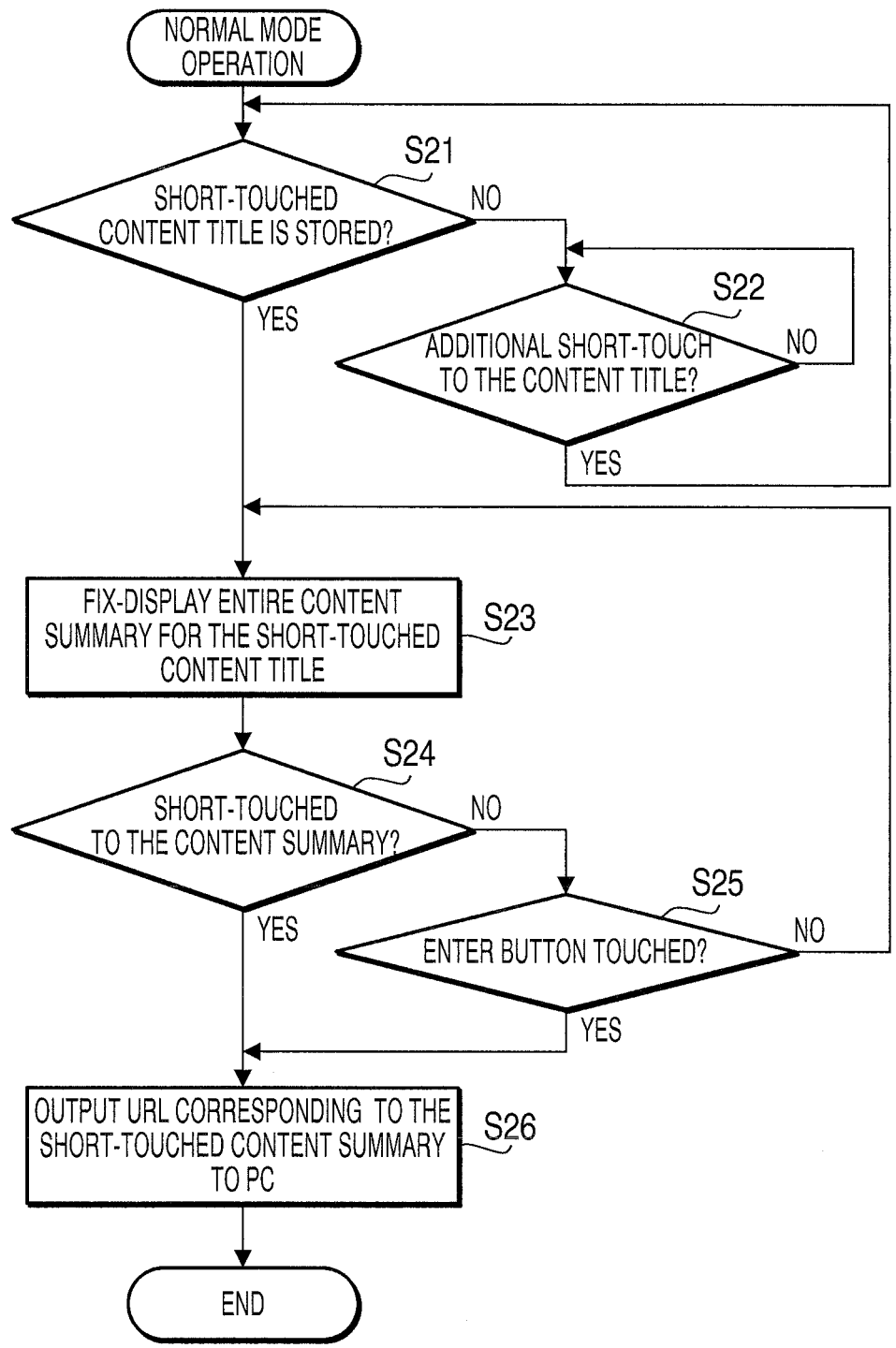
FIG. 6 is a flowchart to illustrate a normal mode operation to be executed by the MFP according to the embodiment of the present invention.

Next, the normal mode operation performed by the CPU 14 of the MFP 10 will be described with reference to FIG. 6. When the normal mode operation starts, in S21, the CPU 14 judges as to whether the content title 140 short-touched in S6 (FIG. 5) is stored in the displayable information storage area 18c.

In the present embodiment, the MFP 10 accesses the content providing servers 90, 91 periodically (e.g., every 30 minute) according to the internet connecting program 16b to obtain the feed information and update the displayable information 112 stored in the displayable information storage area 18c. Therefore, the displayable information 112 may be updated immediately after the short touch to the content title 140. In such a case, the content title 140 having been short-touched may be replaced with a content title 140 in the newly obtained displayable information 112. The judgment in S21 is made in order to avoid the mismatch.

In S21, when the content title 140 short-touched in S6 is not stored in the displayable information storage area 18c (S21: NO), in S22, the CPU 14 judges as to whether another short touch on the content title 140 is detected. When another short touch on the content title 140 is detected (S22: YES), the flow returns to S21. When no additional short touch on the content title 140 is detected (S22: NO), the flow repeats S22 until another short touch on the content title 140 is detected.

In S21, when the content title 140 short-touched in S6 is stored in the displayable information storage area 18c (S21: YES), in S23, the entire character strings included in the content summary 144 corresponding to the short-touched content title 140 (i.e., the content summary 144 included in the same updated-content information 132 as the short-touched content title 140) are displayed in the fixed line in place of the content title 140. In S24, the CPU 14 judges as to whether the character strings in the content summary 144 displayed in the fixed line in the display panel 50 are short-touched.

In S24, when no short touch to the content summary 144 is detected (S24: NO), in S25, the CPU 14 judges as to whether the enter button 51d is touched. When no touch on the enter button 51d is detected (S25: NO), the flow returns to S23, and the CPU 14 maintains the content summary 144 to be displayed in the fixed line.

In S24, when the short touch to the content summary 144 is detected (S24: YES), and when the touch on the enter button 51d is detected (S25: YES), in S26, the URL 146 of the information contents corresponding to the short-touched content summary 144 (i.e., the URL 146 included in the same updated-content information 132 as the short-touched content summary 142) is determined. Further, the determined URL 146 is transmitted to the PCs 70, 71 through the network interface 60.

When the transmitted URL 146 is received in the PCs 70, 71, the PCs 70, 71 activate a browser program installed therein and access the content providing servers 90, 91 based on the received URL 146 to obtain the information contents stored in the location indicated by the URL. Further, the PCs 70, 71 display the obtained information contents in the display units 82 (see FIG. 9E). Thus, the information contents, which are summarized in the content summary 144 and desired by the user, can be presented to the user through the display units 82 of the PCs 70, 71. In this regard, the display units 82 of the PCs 70, 71 have larger screens to display the information contents, which provide better visibility to the user.

In the normal mode operation, as described above, the entire character strings included in the content summary 144 corresponding to the content title 140 short-touched in S6 (FIG. 5) are displayed in the fixed line in the display panel 50. Further, when content summary 144 is short-touched, the URL 146 corresponding to the short-touched content summary 144 is provided to the PCs 70, 71. Accordingly, the user can provide the URL 146 of the desired information contents to the PCs 70, 71 in simple operations.

Figure 7:
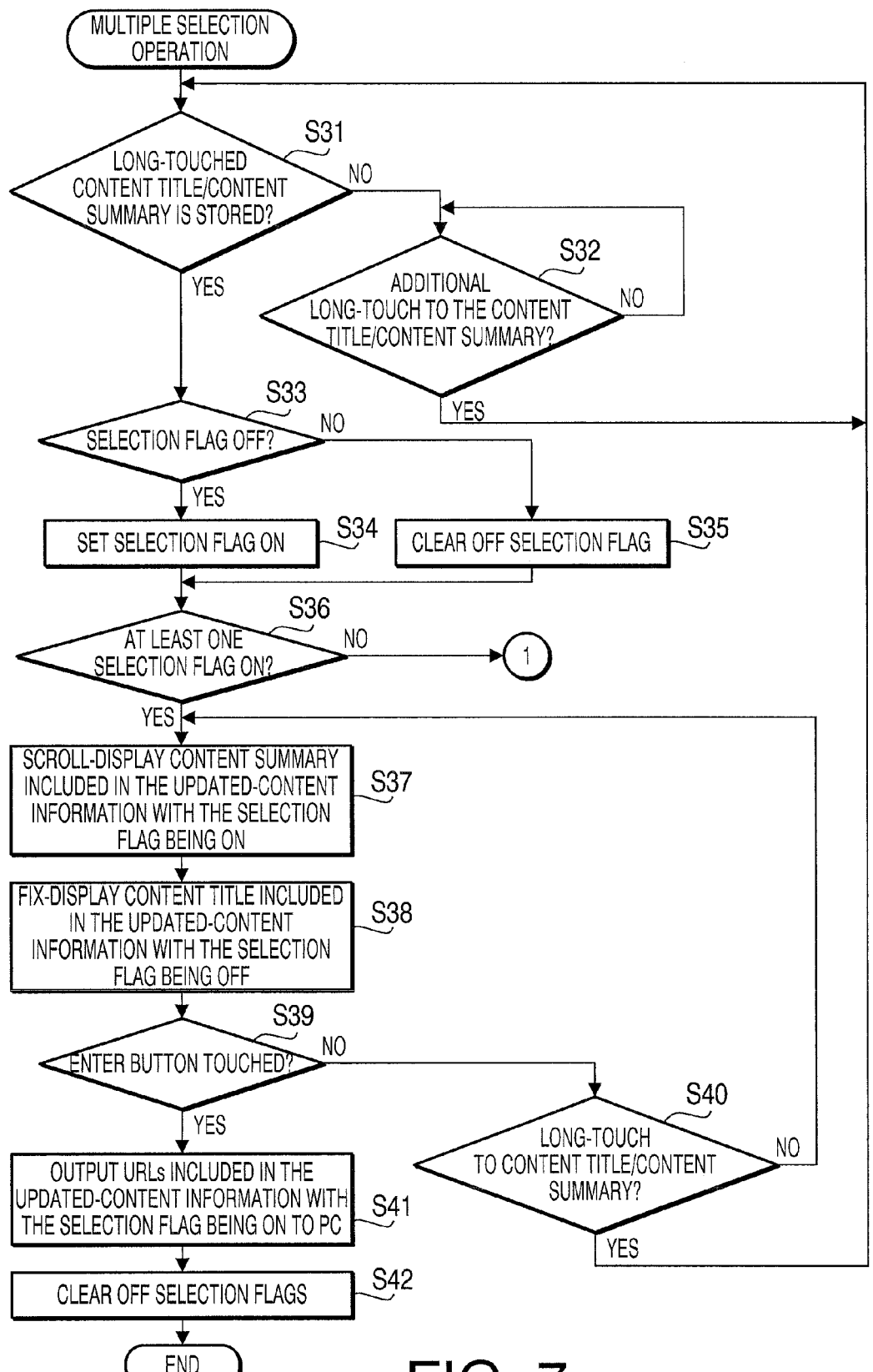
FIG. 7 is a flowchart to illustrate a multiple-selection operation to be executed by the MFP according to the embodiment of the present invention.

Next, the multiple selection operation performed by the CPU 14 of the MFP 10 will be described with reference to FIG. 7. The multiple selection operation starts when the content title 140 displayed in the fixed line (e.g., the fixed line in the display area 51a in FIG. 9B) is long-touched in S9 (FIG. 5). In the multiple selection operation, the content title 140 in the fixed line is replaced with the character strings included in the content summary 144 corresponding to the long-touched content title 140. In this regard, the character strings are scroll-displayed (see the display area 51a in FIG. 9C). Further, when the content title 140 in the fixed line (e.g., the display area 51c in FIG. 9C) is long-touched, the character strings included in the content summary 144 corresponding to the long-touched content title 140 are scroll-displayed additionally (see the display area 51c in FIG. 9D). Furthermore, when the content summary 144 in the scrolling line (e.g., the display area 51a in FIG. 9C) is long-touched, the character strings included in the long-touched content summary 144 are again displayed in the fixed line (e.g., the display area 51a in FIG. 9B).

When the multiple selection operation starts, in S31, the CPU 14 judges as to whether the long-touched content title 140 or the content summary 144 is stored in the displayable information storage area 18c. In the multiple selection operation according to the present embodiment, the content title 140 and the content summary 144 can be long-touched. Therefore, the CPU 14 in S31 examines as to whether the long-touched character strings are those of the content title 140 or of the content summary 144. The judgment in S31 is made due to the same reason as the judgment in S21 (FIG. 6).

In S31, when the long-touched content title 140 or the long-touched content summary 144 is not stored in the displayable information storage area 18c (S31: NO), in S32, the CPU 14 judges as to whether another long touch on the content title 140 in a fixed line or the content summary 144 in a scrolling line is detected. When another long touch on the content title 140 or on the content summary 144 is detected (S32: YES), the flow returns to S31. When no additional long touch on the content title 140 or on the content summary 144 is detected (S32: NO), the flow repeats S32 until another long touch on the content title 140 or on the content summary 144 is detected.

In S31, when the long-touched content title 140 or the long-touched content summary 144 is stored in the displayable information storage area 18c (S31: YES), in S33, the CPU 14 examines as to whether the selection flag 18d for the updated-content information 132 including the long-touched content title 140 or the long-touched content summary 144 is off.

In S33, when the selection flag 18d for the updated-content information 132 including the long-touched content title 140 or the long-touched content summary 144 is off (S33: YES), in S34, the CPU 14 sets the selection flag 18d examined in S33 on. When the selection flag 18d for the updated-content information 132 including the long-touched content title 140 or the long-touched content summary 144 is on (S33: NO), in S35, the CPU 14 clears the selection flag 18d examined in S33 off.

The behavior of the CPU 14 in S33-35 will be described in detail. At the time when the selection flag 18d being off is detected in S33 (S33: YES), neither of the content title 140 or the content summary 144 is displayed in a scrolling line. Rather, the character strings to be long-touched are those of the content title 140 being displayed in a fixed line. Therefore, in S33, if the CPU 14 detects the selection flag 18d for the long-touched character strings being off (S33: YES), it is determined that the character strings that have been long-touched are those included in the content title 140. Therefore, in S34, the selection flag 18d for the updated-content information 132 including the long-touched content title 140 is set on.

Meanwhile, when the selection flag 18d being on is detected in S33 (S33: NO), the content summary 144 is displayed in a scrolling line in the display area having been long-touched. Therefore, in S33, if the CPU 14 detects the selection flag 18d for the long-touched character strings being on (S33: NO), it is determined that the character strings that have been long-touched are those included in the content summary 144 being scroll-displayed. Therefore, in S35, the selection flag 18d for the updated-content information 132 including the long-touched content summary 144 is cleared off.

Following S34 or S35, in S36, the CPU 14 examines the selection flags 18d for the updated-content information 132 being displayed and judges as to whether at least one of the selection flags 18d is on. In S36, it is determined that as to whether any content summary 144 is to be displayed in a scrolling line in any of the display areas 51a-51c. When no selection flag 18d is set on (S36: NO), it is determined that no content summary 144 is to be scroll-displayed in the display areas 51a-51c. The flow returns to S5 (FIG. 5) in the main process. In this regard, the content summary 144 being displayed can be illustrated as shown in FIG. 9B.

In S36, when at least one selection flag 18d is on (S36: YES), it is determined that the content summary 144 is to be scroll-displayed in at least one of the display areas 51a-51c. The flow proceeds to S37.

In S37, the CPU 14 identifies the updated-content information 132 with the selection flag 18d being on. Further, the CPU 14 displays the content summary 144 included in the identified updated-content information 132 in a scrolling line. In S38, the CPU 14 identifies the updated-content information 132 with the selection flag 18d being off. Further, the CPU 14 displays the content title 140 included in the identified updated-content information 132 in a fixed line.

Figure 9B:
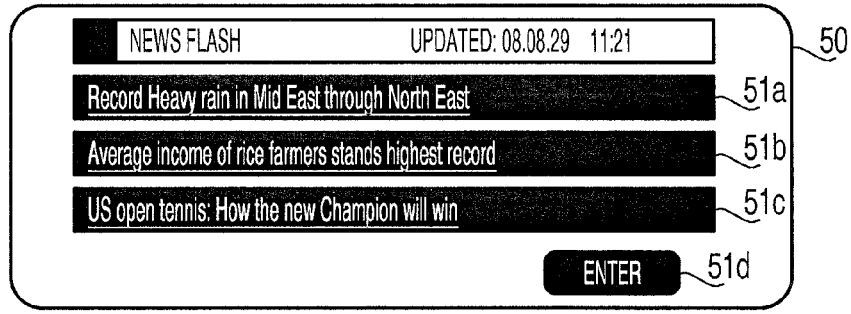

According to the above flow, for example, when the content title 140 being displayed in the fixed line in the display area 51a as shown in FIG. 9B is long-touched in S6 (FIG. 5), the content summary 144 corresponding to the long-touched content title 140 is displayed in the display area 51a in a scrolling display in place of the fixed-displayed content title 140. Therefore, the user of the MFP system 2 can view the plurality of pieces of content summary 144 without a complicated switching operation to switch the scroll/fixed displays. Meanwhile, the content titles 140 in the display areas 51b, 51c are maintained in the fixed lines.

Following S38, in S39, the CPU 14 judges as to whether the enter button 51d is touched (S39). When the enter button 51 is not touched (S39: NO), in S40, the CPU 14 judges as to whether the character strings included in one of the content title 140 and the content summary 144 are long-touched (S40).

In S40, when the CPU 14 determines that neither the content title 140 nor the content summary is long-touched (S40: NO), the flow returns to S37. When one of the content title 140 and the content summary 144 is long-touched (S40: YES), the flow returns to S31 and repeats S31-S40.

Figure 9C:
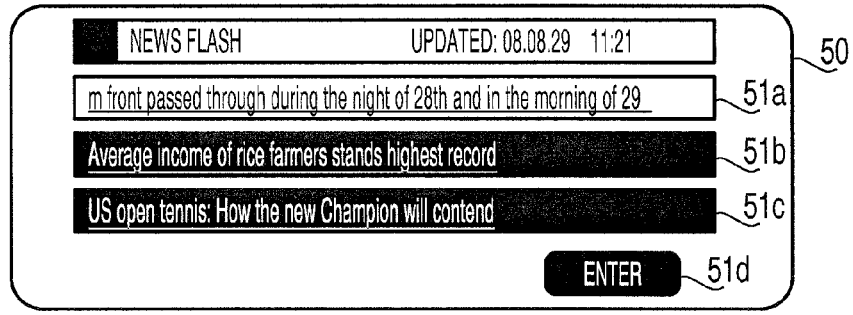
Figure 9D:
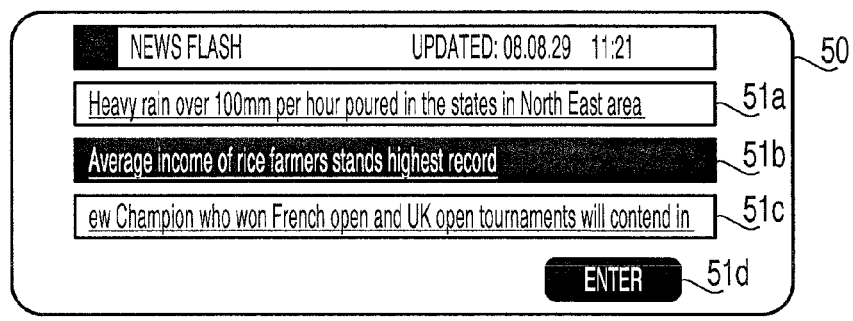
Figure 9E:
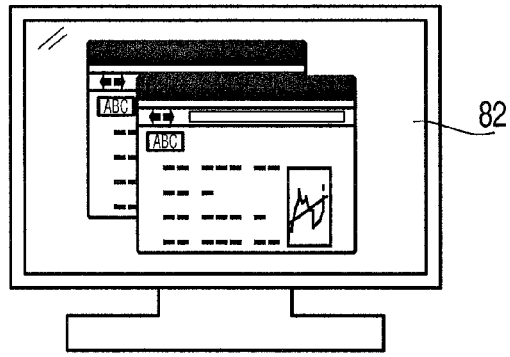

For example, when the character strings are displayed in the display areas 51a-51c as shown in FIG. 9C, and when the content title 140 displayed in the fixed line in the display area 51c is long-touched, in S40, affirmative judgment is made (S40: YES), and the flow in S31-S38 is repeated. Appearance of the display areas 51a-51c is switched as shown in FIG. 9D. Specifically, the content title 140 in the fixed line in the display area 51c is replaced with the scroll-displayed content summary 144 corresponding to the long-touched content title 140. Meanwhile, display in the scrolling line in the display area 51a and the fixed line in the display area 51b is maintained.

For another example, when the character strings are displayed in the display areas 51a-51c as shown in FIG. 9D, and when the content summary 144 displayed in the scrolling line in the display area 51c is long-touched, in S40, affirmative judgment is made (S40: YES), and the flow in S31-S38 is repeated. Appearance of the display areas 51a-51c is switched as shown in FIG. 9C. Specifically, the content summary 144 in the scrolling line in the display area 51c is replaced with the fixed-displayed content title 140 corresponding to the long-touched content summary 144. Meanwhile, display in the scrolling line in the display area 51a and the fixed line in the display area 51b is maintained.

In S39, when the enter button 51 is touched (S39: YES), in S41, the URLs 146 of the information contents included in the updated-content information 132 with the selection flags 18d being on (i.e., the URLs 146 included in the same updated-content information 132 as the scroll-displayed content title 140 and the content summary 144) are determined and transmitted to the PCs 70, 71 through the network interface 60.

When the transmitted URLs 146 are received in the PCs 70, 71, the PCs 70, 71 activate a browser program installed therein and access the content providing servers 90, 91 based on the received URLs 146 to obtain the information contents stored in the location indicated by the URLs 146. Further, the PCs 70, 71 display the obtained information contents in the display units 82 (see FIG. 9E). Thus, the information contents, which are summarized in the content summary 144 and desired by the user, can be presented to the user through the display units 82 of the PCs 70, 71. In this regard, the display units 82 of the PCs 70, 71 have larger screens to display the information contents, which provide better visibility to the user.

Following S41, in S42, the CPU 14 clears all the selection flags 18d off and terminates the multiple selection operation.

According to the multiple selection operation as described above, fixed-display of the content titles 140 can be switched to scroll-display of the corresponding content summaries 144 by the long-touching operation. Further, the URLs 146 corresponding to the scroll-displayed content summaries 144 can be provided to the PCs 70, 71 in a batch.

Further, according to the multiple selection operation, when the content title 140 is long-touched, the content summary 144 to be displayed in a scrolling line is identified based on the updated-content information 132 in which the long-touched content title 140 is included. That is, the content summary 144 included in the same updated-content information 132 is determined to be the content summary 144 to be scroll-displayed. Thus, the content summary 144 can be displayed in a scrolling line effectively without confusion.

Figure 8:
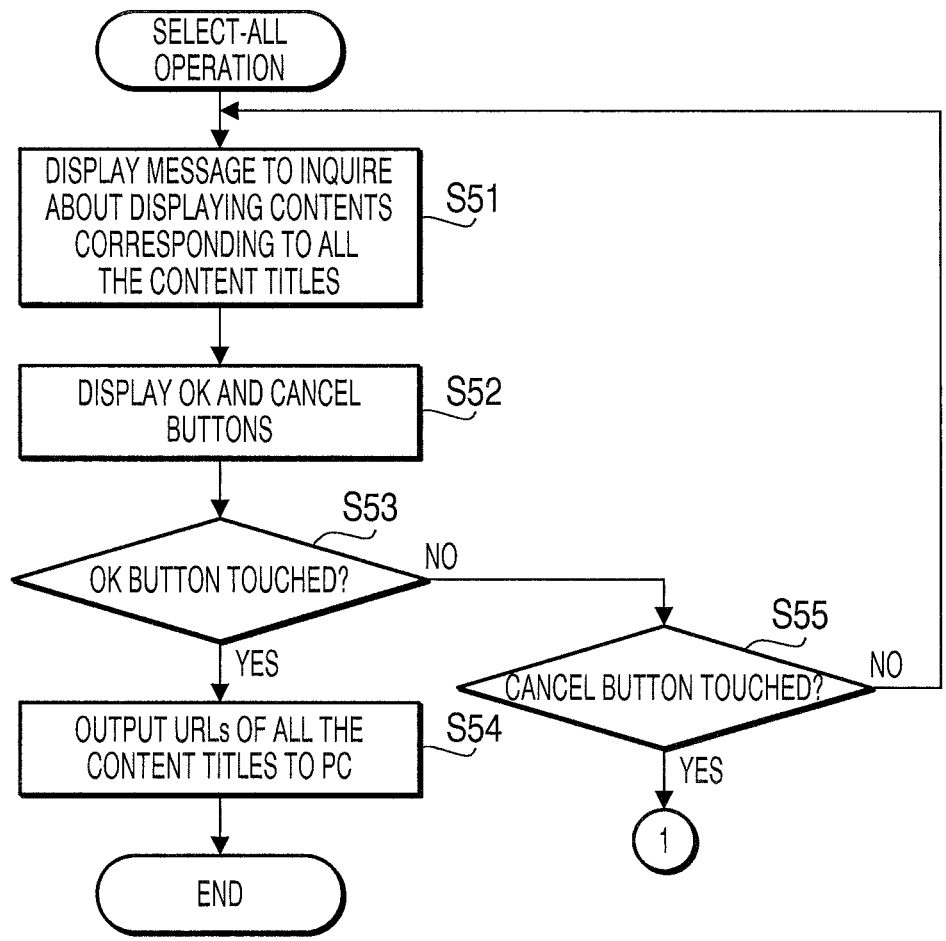
FIG. 8 is a flowchart to illustrate a select-all operation to be executed by the MFP according to the embodiment of the present invention.

Next, the select-all operation performed by the CPU 14 of the MFP 10 will be described with reference to FIG. 8. When the select-all operation starts, in S51, a message to indicate that the information contents corresponding to all the content titles 140 displayed (in S5; see FIG. 5) in the fixed lines in the display areas 51a-51c will be displayed through the PCs 70, 71 is displayed in the display panel 50. For example, when the content titles 140 are displayed in the fixed lines in the display areas 51a-51c, as shown in FIG. 9B, a message to ask the user as to whether the user wishes to have the information contents corresponding to the fixed-displayed content titles 140 presented through the PCs 70, 71 is displayed in the display panel 50.

In S52, the CPU 14 displays an OK button (not shown) and a cancel button (not shown) in the display panel 50 along with the message. In S53, the CPU 14 judges as to whether the OK button is touched.

In S53, when the OK button is touched (S53: YES), in S54, the CPU 14 identifies the updated-content information 132 including the content titles 140 displayed in the fixed lines in the display areas 51a-51c and transmits the URLs 146 of the information contents included in the identified updated-content information 132 to the PCs 70, 71 through the network interface 60. Thereafter, the CPU 14 ends the select-all operation.

When the transmitted URLs 146 are received in the PCs 70, 71, the PCs 70, 71 activate a browser program installed therein and access the content providing servers 90, 91 based on the received URLs 146 to obtain the information contents stored in the location indicated by the URLs 146. Further, the PCs 70, 71 display the obtained information contents in the display units 82 (see FIG. 9E). Thus, the information contents, which are desired by the user, can be presented to the user through the display units 82 of the PCs 70, 71. In this regard, the display units 82 of the PCs 70, 71 have larger screens to display the information contents, which provide better visibility to the user.

In S53, when the OK button is not touched (S53: NO), in S55, the CPU 14 judges as to whether the cancel button is touched. When the cancel button is touched (S55: YES), it is determined that the information contents corresponding to the fixed-displayed content titles 140 will not be presented through the PCs 70, 71. The flow returns to S5 (FIG. 5) in the main process. Appearance of the display panel 50 is switched to that as shown in FIG. 9B.

In S55, when the cancel button is not touched (S55: NO), the flow returns to S52, and the CPU 14 repeats the flow in S52, S53, S55 until one of the OK button and the cancel button is touched.

According to the above-described select-all operation, the URLs 146 of all the content titles 140 which are displayed in the fixed lines in the display areas 51a-51c are provided to the PCs 70, 71 in a batch.

According to the MFP system 2 described in the present embodiment, when the instruction to transmit the URLs 146 corresponding to the scrolling-displayed content summaries 144 is given, the MFP 10 identifies the URLs 146 of the desired information contents based on the updated-content information 132 stored in the displayable information storage 18c. Further, the MFP 10 transmits the identified URLs 146 to the PCs 70, 71. When the transmitted URLs 146 are received in the PCs 70, 71, the PCs 70, 71 activate a browser program installed therein and access the content providing servers 90, 91 based on the received URLs 146 to obtain the information contents stored in the location indicated by the URLs 146. Thus, the PCs 70, 71 display the obtained information contents in the display units 82 in a batch (see FIG. 9E). Accordingly, the information contents can be presented to the user through the display units 82 of the PCs 70, 71, and the user can view the plurality of information contents without a complicated switching operation.

According to the MFP system 2 described in the present embodiment, URLs 146 transmitted to the PCs 70, 71, i.e., the URLs 146 corresponding to the scroll-displayed content summaries 144, are identified based on the updated-content information 132 including the scroll-displayed content summaries 144. That is, the URLs included in the same updated-content information 132 are determined to be URLs to be transmitted. Thus, the URLs can be provided to the PCs 70, 71 effectively without confusion.

According to the MFP system 2, further, the content titles 140 included in the currently designated displayable information 112 are displayed in a single scrolling line. When the content titles 140 being scroll-displayed are touched, the content titles 140 are displayed in fixed lines aligned in parallel in the display areas 51a-51c. Further, when transmission of the URLs 146 corresponding to the fixed-displayed content titles 140 is entered through the OK button, all the URLs 146 corresponding to the fixed-displayed content titles 140 are transmitted and provided to the PCs 70, 71. Accordingly, the user can provide the URL 146 of the desired information contents to the PCs 70, 71 in simple operations.

Although an example of carrying out the invention has been described, those skilled in the art will appreciate that there are numerous variations and permutations of the communication device that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, in the above embodiment, the URLs of the information contents are provided to the PCs 70, 71 in S26 (FIG. 6) in the normal mode operation, in S41 (FIG. 7) in the multiple selection operation, and in S54 (FIG. 8) in the select-all operation. However, the URLs 146 may be provided solely to a preliminarily registered PC. In this configuration, undesired transmission of the URL 146 to an unfamiliar PC, which is not registered in the MFP 10, can be prevented.

For another example, the MFP 10 may have a browser program installed in the NVRAM 20 of the MFP 10. With the browser program installed in the MFP 10, in S26 (FIG. 6) in the normal mode operation, in S41 (FIG. 7) in the multiple selection operation, and in S54 (FIG. 8) in the select-all operation, the URLs 146 may be passed to the NVRAM 20 so that the URLs 146 can be stored in a predetermined area of the NVRAM 20. When the MFP 10 activates the browser program stored in the NVRAM 20, the MFP 10 may accesses the content providing servers 90, 91 with reference to the URLs 146 stored in the NVRAM 20. Accordingly, the MFP 10 obtains the information contents from the content providing servers 90, 91, the MFP 10 can present the information contents to the user through the display panel 50. Thus, the user can view the content information through the display panel 80 of the MFP 10.

In the above embodiment, the number of display areas 51a-51c in the display panel 50 are adjusted according to the number of content titles 140 included in the currently designated displayable information 112. However, the number of display areas may be fixed to, for example, three. When the number is fixed to three, and when, for example, the number of content titles 140 included in the displayable information 112 designated in S1 (FIG. 5) is five, the CPU 14 may extract three content titles 140 out of five content titles 140 to display in fixed lines in the display areas 51a-51c. After a predetermined period (e.g., 3 seconds), the CPU 14 may display the remaining two content titles 140 in fixed lines in the display areas 51a, 51b. After the predetermined period elapsed, the first three content titles 140 may be displayed back in the fixed lines in the display areas 51a-51c. The display of the first three content titles 140 and the remaining two content titles 140 may be switched back and forth. Thus, the display area to be occupied by the content titles 140 can be limited so that the remaining area in the display panel 50 can be used for displaying different information.

Further, the content titles 140 in fixed lines and content summaries 144 in scrolling lines are presented to the user through the MFP 10. However, the content titles 140 and the content summaries 144 may be presented through, for example, a scanner device, a printer device, and a telephone set having a display panel 50.

Furthermore, in the MFP system 2 according to the above embodiment, the MFP 10 and the PCs 70, 71 are wired to each other by a cable. However, the MFP 10, the PCs 70, 71 may be equipped with wireless interfaces, and the MFP 10 can communicate with the PCs 70, 71 wirelessly.

In the above embodiment, each of the content providing servers 90, 91 stores the information contents and the feed information. However, the information contents and the feed information may be separately stored in different servers.

What is claimed is:

1. A communication device capable of accessing a network device storing a plurality of pieces of content-related information, each of the pieces of content-related information including a title and location information of information content and summary information summarizing the information content, comprising:

a location information storage configured to store the location information of the content-related information;

a content-related information obtaining system configured to access the network device according to the location information and obtain the content-related information from the network device;

a content-related information storage to store the obtained content-related information;

a multiple display system having a plurality of display areas, each of which is capable of displaying a line of character strings, the character strings representing the title of the information content included in the obtained content-related information;

the multiple display system having a summary display area, which is capable of displaying a line of character strings, the character strings representing the summary information, a display control system configured to control the title to be displayed in a fixed line in each of the plurality of display areas and configured to control the summary information to be displayed in the summary display area;

a detecting system configured to detect one of a first selecting operation, which indicates selection of the title of the information content being displayed in the fixed line in one of the plurality of areas, and a second selecting operation, which is different from the first selecting operation and indicating the selection for the information content to the title of the information content being displayed in the fixed line in the same one of the plurality of display areas;

an output accepting system configured to accept a plurality of pieces of location information, corresponding to the titles of the information content indicated by the first selecting operation to be outputted to a displayable device; and a summary display system configured to identify the summary information of an information content corresponding to the title of the information content indicated by the second selecting operation and display a line of character strings representing the identified summary information in the summary display area;

a summary selecting operation detecting system configured to detect the second selecting operation to the summary information displayed in the summary display area;

an identifying system configured to identify the location information of the information content corresponding to the selected title of the information content based on the content related-information in which the selected title of the information content is included, the identifying system including a first identifying system to identify all the pieces of location information accepted by the output accepting system based on the content-related information in which the titles of information content indicated by the first selecting operations are included and a second identifying system to identify the location information of the information content corresponding to the summary information, to which the second selecting operation detected by the summary selecting operation detecting system is given; and a location information output system configured to output the identified location information to the displayable device, which is capable of accessing and obtaining the information content according to the outputted location information in order to present the obtained information content to be viewed, the location information output system including a first output system, which outputs all the pieces of location information identified by the first identifying system to the displayable device and a second output system, which outputs the location information of the information content identified by the second identifying system to the displayable device.

2. The communication device according to claim 1, comprising:

a display screen having the plurality of display areas;

wherein the displayable device is an external device independent from the communication device, capable of communicating with the communication device, and having a display screen larger than the display screen of the communication device.

3. The communication device according to claim 1, further comprising:

an all-selection accepting system configured to accept a plurality of pieces of location information, corresponding to all the titles of the information contents displayed in the fixed lines in all of the display areas, to be outputted;

an all-identifying system configured to identify all the location information of the information contents corresponding to all the titles of the information contents displayed in the fixed lines based on the content related-information in which the displayed titles of the information contents are included; and a location information output system configured to output all the identified location information to the displayable device.

4. The communication device according to claim 3, comprising:

a title display system configured to display the titles of the information contents, which are included in the content-related information stored in the content-related information storage, sequentially in a single scrolling line displayed in one of the plurality of display areas;

a title selection receiver system configured to receive selection of the titles of the information contents displayed in the single scrolling line in the one of the display areas; and a content-related information identifying system configured to identify the content-related information including the titles of the information contents being selected when the selection of the titles is received by the title selection receiver system;

wherein the display control system controls each of the titles included in the identified content-related information to be displayed in a fixed line in each of the plurality of display areas;

wherein the all-selection accepting system accepts all the pieces of location information, corresponding to all the titles of the information contents displayed by the display control system in the fixed lines in all of the display areas, to be outputted to the displayable device;

wherein the all-identifying system identifies all the location information of the information contents corresponding to all the titles of the information contents displayed in the fixed lines based on the content-related information in which the displayed titles of the information contents are included when the all-selection accepting system accepts all the pieces of location information to be outputted to the displayable device; and wherein the location information output system outputs all the location information identified by the all-identifying system to the displayable device.

* * * * *